(12) United States Patent
Preston

(10) Patent No.: US 6,942,185 B2
(45) Date of Patent: Sep. 13, 2005

(54) PNEUMATIC RISER RELEASE

(75) Inventor: Daniel Preston, Kew Gardens, NY (US)

(73) Assignee: Atair Aerospace, Inc., Brooklyn, NY (US)

(*) Notice: Subject to any disclaimer, the term of this patent is extended or adjusted under 35 U.S.C. 154(b) by 0 days.

(21) Appl. No.: 10/434,319

(22) Filed: May 7, 2003

(65) Prior Publication Data

US 2004/0026569 A1 Feb. 12, 2004

Related U.S. Application Data

(60) Provisional application No. 60/378,913, filed on May 7, 2002.

(51) Int. Cl.$^7$ ............................................... B64D 17/38
(52) U.S. Cl. .................................................. 244/151 B
(58) Field of Search ................................. 244/147–152

(56) References Cited

U.S. PATENT DOCUMENTS

| | | | | |
|---|---|---|---|---|
| 1,443,745 A | * | 1/1923 | Holt | 244/147 |
| 3,737,126 A | * | 6/1973 | Martin | 244/151 B |
| 3,744,103 A | * | 7/1973 | Gaylord | 24/603 |
| 4,337,913 A | * | 7/1982 | Booth | 244/151 B |
| 4,488,691 A | * | 12/1984 | Lorch | 244/151 R |

* cited by examiner

*Primary Examiner*—Galen Barefoot
(74) *Attorney, Agent, or Firm*—Bourque & Associates

(57) ABSTRACT

An automated quick release mechanism for a three ring release includes a pneumatic or hydraulic cylinder with a hardened metal pin. The pin engages a string loop of the three ring release. An internal spring holds the pin in an extended position. A controller external to the automated quick release mechanism provides a gas or fluid pressure to withdraw the pin and disengage the string loop.

9 Claims, 2 Drawing Sheets

PNEUMATIC RISER RELEASE

This application claims priority to U.S. Provisional Application Ser. No. 60/378,913, filed May 7, 2002.

BACKGROUND OF THE INVENTION

1. Field of the Invention

The present invention relates to release mechanisms for loaded straps. More particularly, it relates to a controllable release for a parachute riser.

2. Discussion of Related Art

In parachute applications, it is desirable to have a quick release to separate the harness from the parachute. Different mechanisms have been used for such a purpose. Originally, a parachutist had to cut the webbing of the risers connecting the parachute to the harness. Early mechanical connections were difficult to use when the webbing was under tension, such as during flight. U.S. Pat. No. 4,337,913, entitled "Means for Releasably Attaching Strands", incorporated herein by reference, disclosed a novel release mechanism which was easily operable, particularly for webbing under tension.

The release mechanism, commonly called a three ring release, consists of several connected strands of webbing, each ending with a ring. The rings are sized so that each can pass through the next larger one. The rings are passed through each other to hold each in place. The smallest ring is held by a loop of string. Each ring forms a lever and a fulcrum for the next ring, providing a mechanical advantage such than a small force is needed to disengage the string loop in order to release thousands of pounds of suspended weight on the mechanism. Typically, the string loop on the three ring release is held in place by a plastic coated wire cable extending through the loop on the back side of the riser webbing. In order to release the riser, the parachutist pulls the wire cable a couple inches so that the end passes through the string loop. The release of the string loop in turn releases the smallest ring, then the next, then the next thus disengaging the mechanism and separating the webbing.

While the three ring release is an excellent mechanism for a quick, easily operable release of risers by a parachutist, it is not easily adaptable for use in unmanned cargo drops. A remote linear actuator could be used to pull the cable. However, there are disadvantages in using a remote linear actuator. The size of an actuator for pulling the cable several inches makes mounting of the actuator a concern. A cable housing is necessary to prevent kinking or binding of the cable, which would prevent movement. The inherent friction between the housing and the cable requires a higher level of force to pull the cable than with the current invention. Additionally, even with a hard cable housing, the cable can kink at the point where it contacts the string loop due to forces on the loop, particularly when high weights or g-forces are encountered. The detent formed at the loop contact point can require a very high actuation force to pull the cable, making a release impossible. A solid metal pin could solve the detent problem but cannot be used at the end of the cable. The flexible nature of the riser would require a very short pin to prevent interference. A short pin could result in premature release. The cable is designed to be pulled several inches to prevent premature release. With a short pin any tension could cause the pin to be pulled prematurely. Therefore, a need exists for a quick release mechanism which can be used for unmanned operation.

SUMMARY OF THE INVENTION

According to an aspect of the present invention, a three ring release mechanism is held by miniature, specialized pneumatic piston. The piston rod acts as a pin that extends through a hole drilled in the cylinder head block orthogonal to the piston rod. When extended the pin is used to trap the three ring release loop in place. Pneumatic power causes the piston to move extracting the pin back into the cylinder body thus releasing the three ring loop.

In setting the mechanism, the pin is extended a very short distance to engage the string loop of the three ring release. According to an aspect of the invention, a tube connects the cylinder to the controller for supplying pressurized gas or fluid to the cylinder for operation. According to another aspect of the invention, the pin is held in the extended position by an internal spring in order to prevent accidental release.

According to another aspect of the invention, a pyrotechnic charge can be used to release the pin instead of a pneumatic or hydraulic cylinder. The charge could be triggered by a control signal, provided either by wire or wirelessly from the controller.

DETAILED DESCRIPTION

Figure 1:
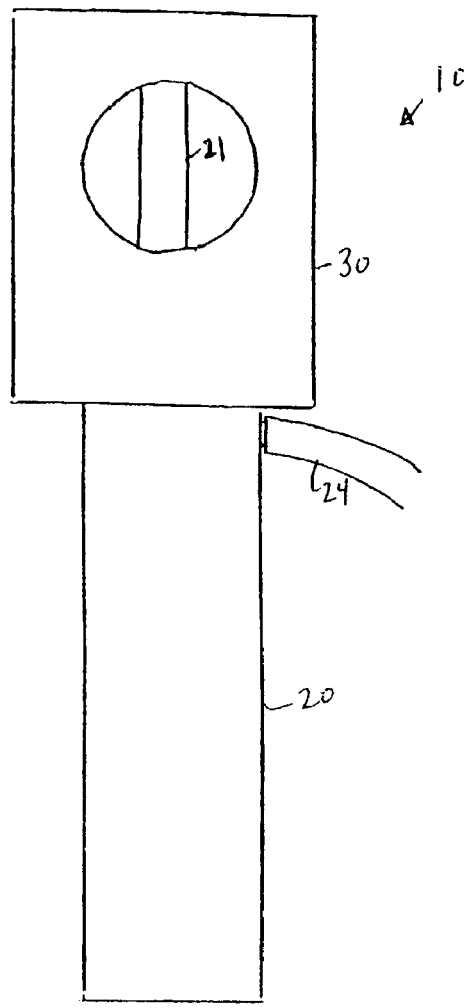
FIG. 1 is a front view of a release control mechanism according to an embodiment of the invention.
Figure 2:
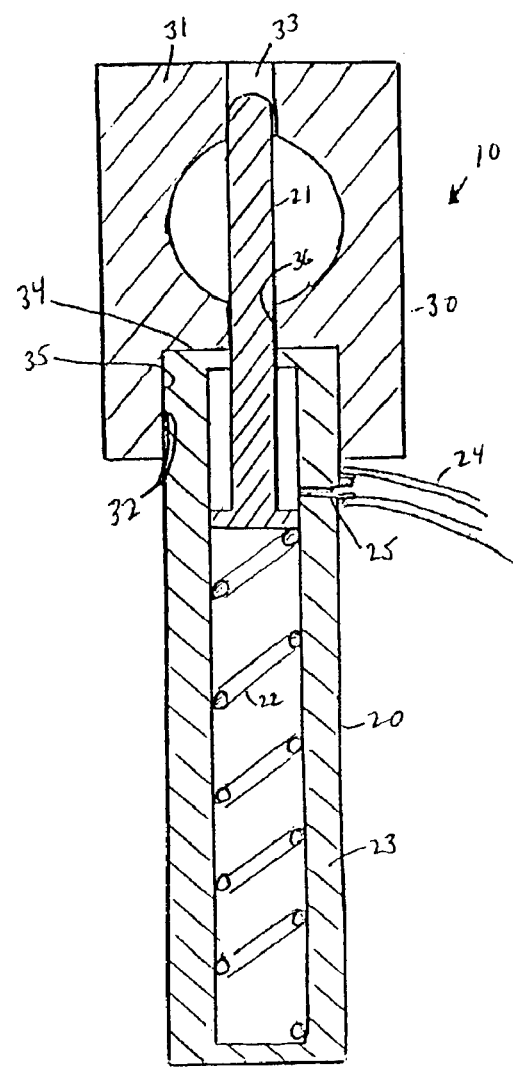
FIG. 2 is a cross sectional view of the release mechanism of FIG. 1.

FIG. 1 illustrates an embodiment of a release control mechanism 10 according to an embodiment of the invention. The release control mechanism 10 includes a pneumatic or hydraulic cylinder 20 and a engagement hole 30. FIG. 2 is a cross sectional view of the release control mechanism 10 which illustrates the relationship between the components. The cylinder 20 includes a hardened pin 21 which extends into the engagement hole 30 when in the extended position. When retracted, the pin 21 is completely disengaged from the engagement hole 30. The pin 21 is held in the extended position by an internal spring 22 within the body 23 of the cylinder 20. The engagement hole 30 includes a metal frame 31, with a first bore 32 and a second bore 33. The first and second bores are coaxially aligned. The first bore 32 includes a shoulder 34 between a first portion 35 of a larger diameter and a second portion 36 of a smaller diameter. The first portion 35 of the first bore 36 is sized to receive the cylinder 20. The second portion 36 of the first bore and the second bore 33 are both sized to receive the pin 21. The engagement hole 30 also includes a third bore 37 perpendicular to the first and second bores. The third bore 37 is sized to receive the string loop of the three ring release mechanism. When in the extended position, the pin 21 extends from the first bore 32 through the third bore 37 and into the second bore 33. When retracted, the pin 21 does not extend past the first bore 32. A flexible tube 24 connects to the cylinder 20 to provide gas or fluid. The gas or fluid from the flexible tube 24 passes through an internal conduit 25 in the body 23 to a control chamber 26 at the front of the cylinder 20. A controller (not shown) connected to the other end of the flexible tube 24 provides pressure to force the gas or fluid into the control chamber 26. The gas or fluid forces the pin 21 back against the spring 22 to retract the pin from the engagement hole 30. When the pressure is released, the pin 21 returns to the extended position.

Figure 3:
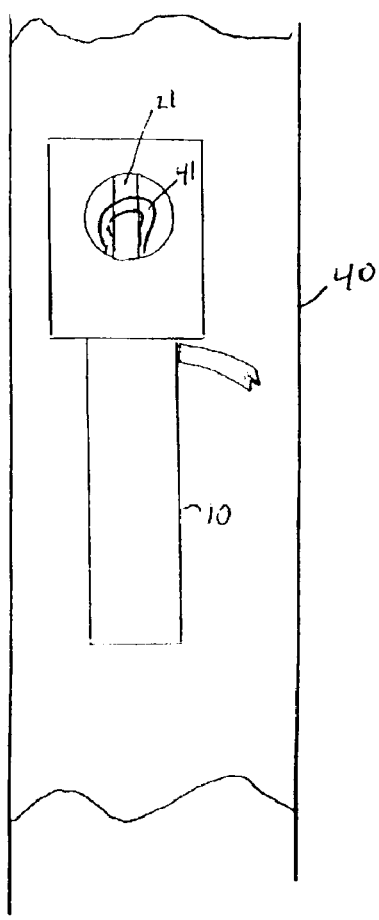
FIG. 3 is a front view of a release mechanism attached to webbing of a three ring release according to an embodiment of the invention.

FIG. 3 illustrates the release control mechanism 10 of the present invention as attached to a three ring release mechanism 40. The release control mechanism 10 is attached to the back side of the three ring release mechanism 40. The position of the release control mechanism 10 is the same as the end of a cable would be in a conventional system. To set the release, the rings of the three ring release are engaged. The string loop 41 is passed around the smallest ring and into a hole in the webbing of the release mechanism. The engagement hole 30 is positioned behind the hole in the webbing. The string loop 41 extends into the engagement hole 30 and is held in place by the pin 21 of the release control mechanism. The pin 21 must be retracted in order allow the string loop 41 to be inserted to into engagement hole 30. The pin is then extended into the engagement hole 30 to engage the string loop. When the riser is to be released, the pin 21 is retracted so that the string loop is released.

Figure 4:
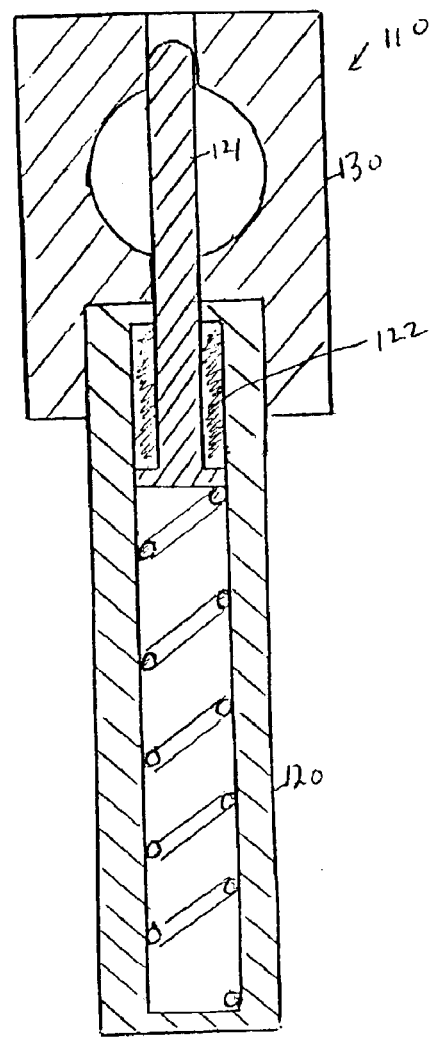
FIG. 4 illustrates a cross sectional view of a second embodiment of the release mechanism of the present invention.

FIG. 4 illustrates a cross sectional view of a second embodiment of the present invention. As in the first embodiment, the release control mechanism 110 of the second embodiment includes a cylinder 120 and engagement hole 130. The cylinder 120 does not include a pneumatic or hydraulic control. No flexible tube is required. Instead, the second embodiment includes a pyrotechnic charge 122 in the control chamber. When the riser is to be released, a signal is sent to fire the pyrotechnic charge. The firing of the pyrotechnic charge causes the pin 121 to be withdrawn from the engagement hole 130, which releases the string loop. The pin automatically returns to the extended position.

What is claimed is:

1. A parachute quick release comprising:
   a cascading three ring release having a string loop closure;
   a pin having a longitudinal axis disposed substantially parallel to a longitudinal axis of said cascading three ring release; and
   a pin release mechanism to engage the string loop closure of the cascading three ring release, wherein the pin release mechanism includes a cylinder adapted to move the pin along a direction parallel to said longitudinal axis of said cascading three ring release, whereby in a first position the string loop closure is engage with the pin and whereby in a second position the string loop is disengaged with the pin.

2. The parachute quick release of claim 1, further comprising:
   a cylinder controller selectively providing a source of compressed gas to the cylinder; and
   a flexible connector attaching the cylinder to the cylinder such that the source of compressed gas causes the cylinder to move the pin.

3. The parachute quick release of claim 1, wherein the cylinder comprises a cylinder having a pyrotechnic charge for moving the pin.

4. The parachute quick release of claim 1, further comprising:
   a pin enclosure for supporting the pin, wherein the pin enclosure includes a bore perpendicular to a direction of movement of the pin for receiving a portion of the string loop for engagement by the pin.

5. The parachute quick release of claim 1, further comprising:
   a spring for retaining the pin in the first position.

6. The parachute release of claim 1, wherein the three ring release is attached to webbing of a parachute.

7. A parachute quick release comprising:
   a cascading three ring release having a string loop closure; and
   a release mechanism including a piston disposed at least partially within a cylinder such that a longitudinal axis of said piston is disposed substantially parallel to a longitudinal axis of said cascading three ring release, whereby said release mechanism includes a first position wherein said piston is disposed through the string loop closure of the three ring release loop such that said cascading three ring release secures a harness to a parachute and a second position wherein said piston disengages from said string loop closure of the three ring release loop such that said cascading three ring release releases said harness from said parachute.

8. The parachute quick release as claimed in claim 7 wherein said cylinder moves said piston from said first position to said second position along a direction parallel to a longitudinal axis of said cascading three ring release.

9. A method of releasably securing a harness to a parachute, said method comprising:
   securing said harness to a largest ring of a cascading three ring release;
   securing said parachute to at least said smallest ring of said cascading three ring release;
   disposing a string loop through said smallest ring and through an engagement aperture of a release mechanism, said release mechanism secured to said cascading three ring release; and
   extending a piston of said release mechanism through a first aperture of said engagement aperture, through said string loop, and into a second aperture of said engagement aperture, wherein said piston secures said string loop which in turn secures said smallest ring.

* * * * *